Oct. 13, 1953　　　J. A. CARPENTER ET AL　　　2,655,332
BAND CLAMP LOCK
Filed March 29, 1948
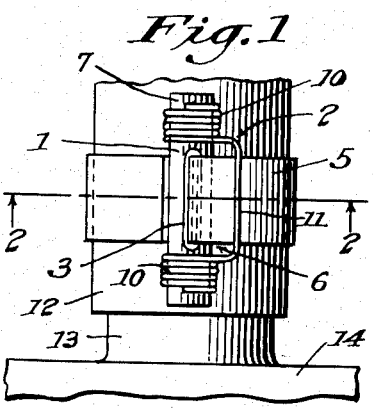
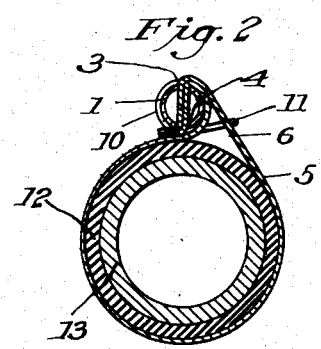
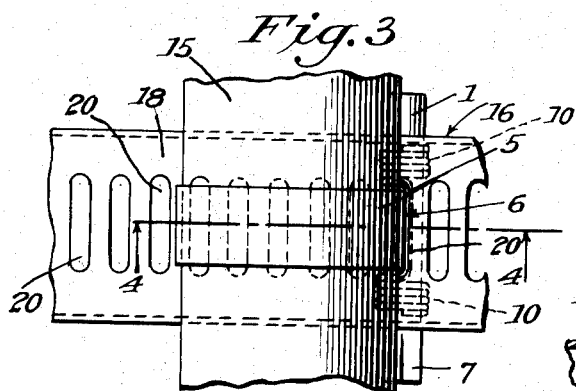
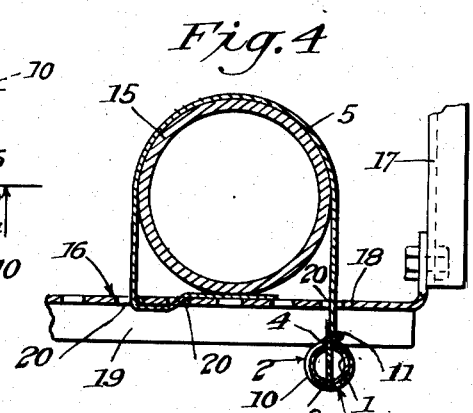
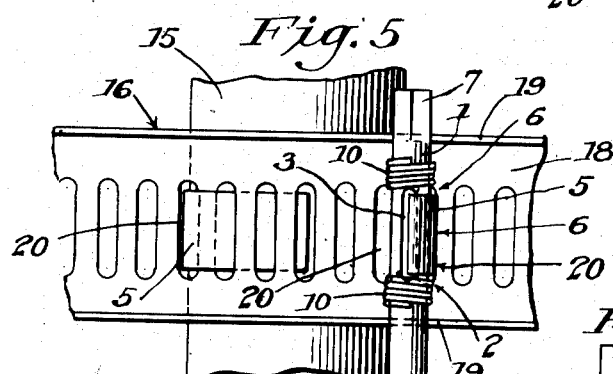
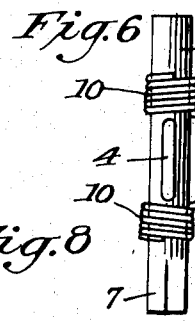
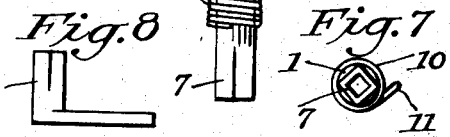
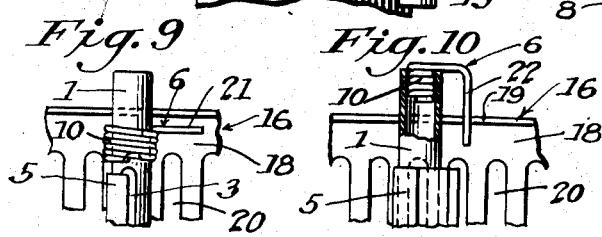
INVENTOR:
John A. Carpenter,
Arley D. Carpenter,
BY Alan Franklin,
ATTORNEY.

Patented Oct. 13, 1953

2,655,332

UNITED STATES PATENT OFFICE 2,655,332

BAND CLAMP LOCK

John A. Carpenter and Arley D. Carpenter, Los Angeles, Calif.

Application March 29, 1948, Serial No. 17,704

2 Claims. (Cl. 248—73)

This invention relates to locks, and more particularly to a band-clamp lock, for locking a band clamp in clamping position around an element, such as a hose, cable, conductor, pipe or the like, for clamping the same to another object.

The general object of the invention is to provide a simple detachable lock, which may be readily actuated and which will effectively lock a band clamp around an element in position for clamping said element to a coacting object, and more particularly for locking a band clamp in position for clamping the end of a hose around a nipple or the end of a pipe, or for clamping a cable, conductor, pipe or the like to a support, such as a hanger bar.

Other objects and advantages will appear hereinafter as this specification progresses.

The invention is illustrated in the annexed drawing which forms a part of this specification and in which:

Fig. 1 is a front elevation of my invention shown locking a band clamp in position clamping an end of a hose around a nipple.

Fig. 2 is a cross section of my invention taken on line 2—2 of Fig. 1.

Fig. 3 is plan view of a band clamp shown clamping a pipe on a hanger bar, with said clamp locked in clamping position by my invention.

Fig. 4 is a cross section of Fig. 3 taken on line 4—4 of Fig. 3.

Fig. 5 is a bottom plan view of Fig. 3.

Fig. 6 is a bottom plan view of my invention shown detached from the band of a band clamp.

Fig. 7 is an end view of my invention showing the key-receiving end of the winding bolt thereof.

Fig. 8 is a plan view of the key for turning the winding bolt.

Fig. 9 is a bottom plan view of a modification of my invention.

Fig. 10 is a bottom plan view of another modification of my invention.

Referring more particularly to the drawing, in which the same parts are designated by the same reference numerals in all of the figures, our invention includes a cylindrical tubular key winding bolt 1 and a spring locking keeper 2.

The key winding bolt 1 is provided with a pair of diametrically opposite longitudinal slots 3 and 4 in its wall intermediate its ends, through which slots one or both ends of the band 5 of a band-clamp 6 are extended. On one end of the key winding tubular bolt 1 is formed a key-receiving part 7 to receive a key 8 for turning said bolt.

The spring locking keeper 2 comprises a piece of spring wire 9 bent at its ends into a pair of spring coils 10 coiled in the same direction and bent from the inner ends of said coils into a straight connecting member 11 extending between and outwardly from said coils.

The key bolt 1 is inserted through the spring coils 10 of the keeper 2 with said coils at opposite ends of the slots 3 and 4, and said coils fitting snugly around said key bolt 1.

In the form of our invention shown in Figs. 3 to 5 inclusive our invention is shown applied to a band clamp for locking said clamp in position clamping a cable, conductor, pipe or other element 15 on a hanger bar 16 which bar is suspended at its ends on supports 17, said hanger bar being formed with an upper wall 18 and side walls 19 and it is provided with a plurality of spaced slots 20 extending transversely of said bar.

The operation of this form of our invention is as follows:

The clamp band 5 is bent around the upper side of the cable, conductor, pipe or other element 15 and the ends of said clamp band are extended downwardly through two slots 20, in the upper wall 18 of the hanger bar 16. One end of said clamp band is bent at right angles against the under side of said hanger bar and is extended upwardly through another slot 20 in said hanger bar and over the upper side of said hanger bar and under said cable, conductor, pipe or other element 15, while the other end of said clamp band is extended downwardly on the inner side of the engaging member 11 of the locking keeper 2 and over and around one side of the key bolt 1, and then upwardly through the slots 3 and 4 of said key bolt above said bolt and adjacent the inner side of the clamp band, with the key bolt engaging the under side of the hanger bar 16. The key 8 is then inserted into the key end 7 of the key bolt 1 and, by means of said key, the key bolt is turned to wind the clamp band 5 thereon, and, with the key bolt engaging the under side of the hanger bar 16, the clamp band 5 is drawn tight around the cable, conductor, pipe or other element 15, until said element 15, engaging the adjacent end of the clamp band underneath said element, is firmly clamped upon the hanger bar 16, with said end of said band firmly clamped between said element and said hanger bar, while the engaging member 11 of the keeper 2 engages and binds against the outer side of the clamp band 5 and the spring coils 10 of said keeper are drawn and coiled tightly around the key bolt 1, thus locking the band clamp in position clamping the element 15 upon the hanger bar 16.

In the form of our invention shown in Fig. 9 only one spring 19 is used, which is coiled around the outside of the bolt 1, while the engaging member 11 is eliminated, and one end 21 of said spring extends from said coil and engages the under side of the upper wall 18 of the hanger bar 16, to anchor said end of the spring to a fixed part, so that said spring will be drawn tight around the bolt 1 of the lock upon turning said bolt in one direction whereby the bolt is locked against turning in the other direction.

The modification of our invention shown in Fig. 10 is like that shown in Fig. 9 except that the coil 10 of our lock is fitted in one end of the tubular bolt 1 and one end 22 of said coil extends outside of said end of the bolt and engages a side flange 19 of the hanger bar 16 so that upon turning said bolt in one direction said coil is expanded tightly into engagement with the inner side of the wall of the tubular bolt and locks said bolt against turning in the opposite direction.

I claim:

1. In combination with a hanger bar provided with a plurality of spaced transverse slots and an element extending across said hanger bar, a band clamp including a band extending over said element, with one end of said band extending through one of said slots in said hanger bar, back through another of said slots and then between said hanger bar and said element, a turn bolt having a portion provided with slots therein which slots receive the other end of said band extended through another of said hanger bar slots and around said turn bolt, and a keeper formed with a pair of spring coils, said coils being wound in the same direction around said turn bolt, and a connecting member connected at its ends, respectively, to the inner end of each of said coils, said connecting member extending substantially parallel and in spaced relation to said slotted portion, said band being adapted to bear against said connecting member, said turn bolt being adapted to be turned with said band engaging one side of said coil connecting member and loosening the coils of said spring coil on said turn bolt until said turn bolt firmly engages said hanger bar, said bolt being prevented from turning in the opposite direction when the band engages the side of said member opposite to said one side with the first mentioned end of said band being clamped between said element and said hanger bar.

2. In combination with a hanger bar provided with transverse slots therein and an element extending across said hanger bar, a band clamp including a band extending over said element with one end of said band anchored to said hanger bar, a turn bolt having a portion provided with slots therein which receives the other end of said band extended through one of said slots in said hanger bar and around said turn bolt, and a keeper comprising a coil spring, said coil spring being wound around the turn bolt and having a member extending from one end thereof in a direction substantially parallel and in spaced relation to said slotted portion, said band being adapted to bear against said member, said turn bolt being adapted to be turned with said band engaging one side of said member and loosening the coil of said coil spring on said turn bolt, until said bolt engages said hanger bar and draws said band tightly over said element, said bolt being prevented from turning in the opposite direction when the band engages the side of said member opposite to said one side.

JOHN A. CARPENTER.
ARLEY D. CARPENTER.

References Cited in the file of this patent

UNITED STATES PATENTS

| Number | Name | Date |
|---|---|---|
| 508,822 | Evory | Nov. 14, 1893 |
| 1,963,436 | Dunke | June 19, 1934 |
| 2,387,951 | Slater et al. | Oct. 30, 1945 |
| 2,560,845 | Carpenter | July 17, 1951 |

FOREIGN PATENTS

| Number | Country | Date |
|---|---|---|
| 323,724 | Italy | of 1935 |
| 614,713 | France | Sept. 24, 1926 |